(12) United States Patent
Bowman et al.

(10) Patent No.: US 11,449,886 B1
(45) Date of Patent: Sep. 20, 2022

(54) DIGITAL PROMOTION PROCESSING SYSTEM GENERATING A DIGITAL PROMOTION BASED UPON MATCHING RECIPE FOOD INGREDIENTS AND RELATED METHODS

(71) Applicant: INMAR CLEARING, INC., Winston-Salem, NC (US)

(72) Inventors: Jacob Bowman, High Point, NC (US); Melissa Bube, High Point, NC (US); Joel Corra, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 94 days.

(21) Appl. No.: 16/155,123

(22) Filed: Oct. 9, 2018

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0224* (2013.01); *G06Q 30/0217* (2013.01); *G06Q 30/0239* (2013.01); *G06Q 50/01* (2013.01)

(58) Field of Classification Search
CPC ........... G06Q 30/0207; G06Q 30/0224; G06Q 30/0239; G06Q 30/0241; G06Q 30/0251;
(Continued)

(56) References Cited

U.S. PATENT DOCUMENTS 9,961,204 B1 * 5/2018 Moran ................. G06Q 30/016

2003/0208384 A1 * 11/2003 Nelson ................... G06Q 40/08
705/4
(Continued)

FOREIGN PATENT DOCUMENTS

WO   WO-2018214163 A1 * 11/2018   ......... G06F 16/9535

OTHER PUBLICATIONS

Social Media Today. 9 Great Examples of How Brands are Using Chatbots, Internet Archive Way Back Machine Capture date of May 23, 2018 from URL https://www.socialmediatoday.com/news/9-great-examples-of-how-brands-are-using-chatbots/524138/ (Year: 2018).*

(Continued)

*Primary Examiner* — Michael Bekerman
(74) *Attorney, Agent, or Firm* — Allen, Dyer, Doppelt + Gilchrist, P.A.

(57) ABSTRACT

A digital promotion processing system may include user devices each associated with a respective user. Each respective user may have a social media account associated therewith. The system may also include a digital promotion server that includes a memory and a processor coupled thereto and configured to determine liked food content on a social media platform for a given user based upon the corresponding social media account. The liked food content may include at least one liked food ingredient. The processor may also be configured to determine a matching recipe including food ingredients and associated preparation instructions. At least one of the food ingredients may include the at least one liked food ingredient. The processor may generate a digital promotion for at least one of the food ingredients of the matching recipe, and communicate the matching recipe and the digital promotion to the corresponding user device of the given user.

17 Claims, 4 Drawing Sheets

(58) Field of Classification Search
CPC ........... G06Q 30/0269; G06Q 30/0271; G06Q 30/0277
See application file for complete search history.

(56) References Cited

U.S. PATENT DOCUMENTS

| | | | | |
|---|---|---|---|---|
| 2007/0043750 | A1* | 2/2007 | Dingle | G06F 16/90335 |
| 2007/0192853 | A1* | 8/2007 | Shraim | H04L 63/1483 |
| | | | | 726/22 |
| 2008/0319850 | A1* | 12/2008 | Shaul | G06Q 30/0277 |
| | | | | 705/14.48 |
| 2009/0119173 | A1* | 5/2009 | Parsons | G06Q 30/02 |
| | | | | 705/1.1 |
| 2009/0119259 | A1* | 5/2009 | Williams | G06F 16/9535 |
| 2011/0119130 | A1* | 5/2011 | Agan | G06Q 30/02 |
| | | | | 705/14.49 |
| 2012/0011432 | A1* | 1/2012 | Strutton | G06Q 30/02 |
| | | | | 715/234 |
| 2012/0022930 | A1* | 1/2012 | Brouhard | G06Q 30/0229 |
| | | | | 705/14.22 |
| 2012/0191629 | A1* | 7/2012 | Shae | G06F 16/332 |
| | | | | 706/11 |
| 2013/0138526 | A1* | 5/2013 | Petruzzi | G06Q 30/0605 |
| | | | | 705/26.2 |
| 2013/0166366 | A1* | 6/2013 | Allen | G06Q 30/0207 |
| | | | | 705/14.25 |
| 2014/0059051 | A1* | 2/2014 | Graves, Jr. | G06F 16/13 |
| | | | | 707/740 |
| 2014/0074649 | A1* | 3/2014 | Patel | G06Q 30/0631 |
| | | | | 705/26.7 |
| 2015/0006288 | A1* | 1/2015 | Forsblom | G06Q 30/0251 |
| | | | | 705/14.54 |
| 2016/0140619 | A1* | 5/2016 | Soni | H04L 51/52 |
| | | | | 705/14.66 |
| 2016/0171530 | A1* | 6/2016 | Sa | G06Q 30/0251 |
| | | | | 705/14.49 |
| 2016/0337387 | A1* | 11/2016 | Hu | G06F 16/2246 |
| 2017/0180276 | A1* | 6/2017 | Gershony | H04L 51/02 |
| 2018/0033074 | A1* | 2/2018 | Grueneberg | G06Q 30/0633 |
| 2018/0096411 | A1* | 4/2018 | Charles | G06Q 30/0627 |
| 2018/0114284 | A1* | 4/2018 | Greenberger | G06Q 30/0282 |
| 2019/0066659 | A1* | 2/2019 | Imai | G10L 15/063 |
| 2019/0228855 | A1* | 7/2019 | Leifer | G06N 5/04 |

OTHER PUBLICATIONS

Coupons in the News, Here Come the Chatbots—And They Have Coupons!, Internet Archive Way Back Machine Capture Date of Dec. 10, 2017 from URL https://couponsinthenews.com/2017/12/04/here-come-the-chatbots-and-they-have-coupons/ (Year: 2017).*
PracticalEcommerce, What are Chatbots and How Do They Work? Internet Archive Way Back Machine Capture Date of Apr. 23, 2017 from URL https://www.practicalecommerce.com/What-Are-Chatbots-and-How-Do-They-Work (Year: 2017).*
Balasudarsun, N. L., M. Sathish, and K. Gowtham. "Optimal ways for companies to use Facebook Messenger Chatbot as a Marketing Communication Channel." Asian Journal of Business Research 8.2 (2018): 1-17. (Year: 2018).*
Fadhil, Ahmed. "Can a chatbot determine my diet?: Addressing challenges of chatbot application for meal recommendation." arXiv preprint arXiv:1802.09100 (2018). (Year: 2018).*
Bowman et al.. U.S. Appl. No. 16/667,259, filed Oct. 29, 2019; Docket No. 74190 (cited Utility Application is stored in the USPTO's Pair Ifw system).

* cited by examiner

DIGITAL PROMOTION PROCESSING SYSTEM GENERATING A DIGITAL PROMOTION BASED UPON MATCHING RECIPE FOOD INGREDIENTS AND RELATED METHODS

TECHNICAL FIELD

The present invention relates to the field of electronics, and more particularly, to digital promotion processing and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Social media is a relatively popular communication technology. A social media platform is a computer implemented social platform that facilitates the creation and sharing of information, such as, for example, photos, videos, etc., and ideas, for example, short written thoughts of users. Within a social media platform, a given user may create an account and establish a profile including posted and/or reposted content, establish a network of users, and comment and interact with content from other users.

SUMMARY

A digital promotion processing system may include a plurality of user devices each associated with a respective user. Each respective user may have a social media account. The digital promotion processing system may also include a digital promotion server that includes a memory and a processor coupled thereto. The processor may be configured to determine liked food content on a social media platform for a given user based upon the corresponding social media account. The liked food content may include at least one liked food ingredient. The processor may also be configured to determine a matching recipe that includes a plurality of food ingredients and associated preparation instructions. At least one of the plurality of food ingredients may include the at least one liked food ingredient. The processor may also be configured to generate a digital promotion for at least one of the food ingredients of the matching recipe, and communicate the matching recipe and the digital promotion to the corresponding user device of the given user.

The digital promotion may be for the at least one liked food ingredient, for example. The digital promotion may be for one of the plurality of food ingredients other than the at least one liked food ingredient.

The liked food content may be associated with a brand. The digital promotion server may be configured to generate the digital promotion for at least one of the food ingredients of the matching recipe associated with the brand, for example. The liked food content may include at least one of a liked recipe including the at least one liked food ingredient, a liked blog post about the at least one liked food ingredient, and a liked advertisement about the at least one liked food ingredient, for example.

The digital promotion server may be configured to operate a messenger bot to collect information and communicate the digital promotion to the corresponding user device based upon the collected information. The information collected from the messenger bot may include at least one of a user name, social media profile, user date of birth, user geographic location, and desired product from a brand thereof, for example.

A method aspect is directed to a method of processing a digital promotion. The method may include using a digital promotion server that includes a processor and an associated memory to determine liked food content on a social media platform for a given user based upon a social media account associated with a respective user. The respective user may be associated with a user device from among a plurality thereof. The liked food content may include at least one liked food ingredient. The method may include using the digital promotion server to determine a matching recipe that includes a plurality of food ingredients and associated preparation instructions. At least one of the plurality of food ingredients may include the at least one liked food ingredient. The method may also include using the digital promotion server to generate a digital promotion for at least one of the food ingredients of the matching recipe and communicate the matching recipe and the digital promotion to the corresponding user device of the given user.

A computer readable medium aspect is directed to a non-transitory computer readable medium for processing a digital promotion. The non-transitory computer readable medium includes computer executable instructions that when executed by a processor cause the processor to perform operations. The operations may include determining liked food content on a social media platform for a given user based upon a social media account associated with a respective user. The respective user may be associated with a user device from among a plurality thereof. The liked food content may include at least one liked food ingredient. The operations may also include determining a matching recipe that includes a plurality of food ingredients and associated preparation instructions. At least one of the plurality of food ingredients may include the at least one liked food ingredient. The operations may also include generating a digital promotion for at least one of the food ingredients of the matching recipe and communicating the matching recipe and the digital promotion to the corresponding user device of the given user.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
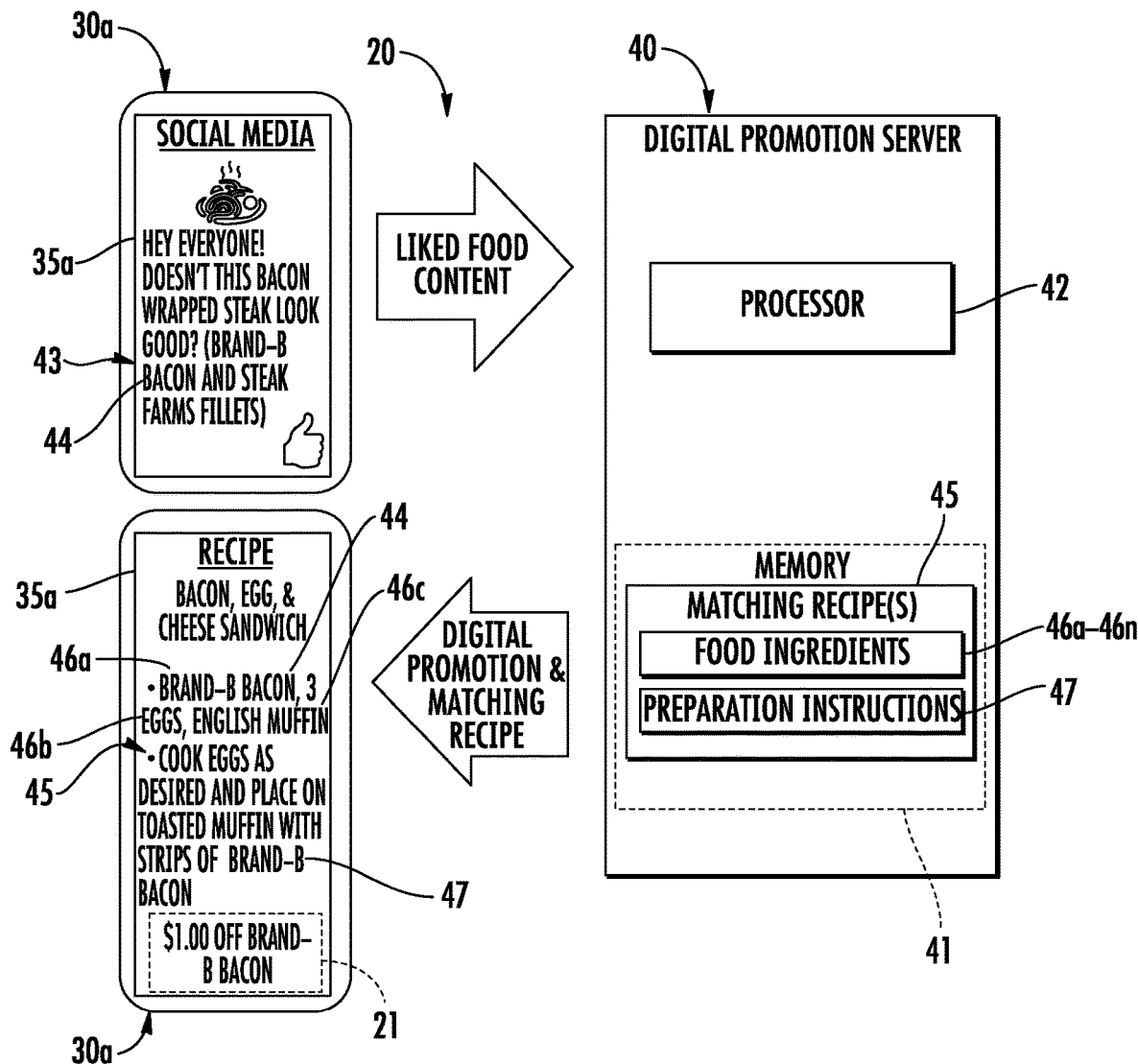
FIG. 1 is a schematic diagram of a system for processing a digital promotion in accordance with an embodiment.
Figure 2:
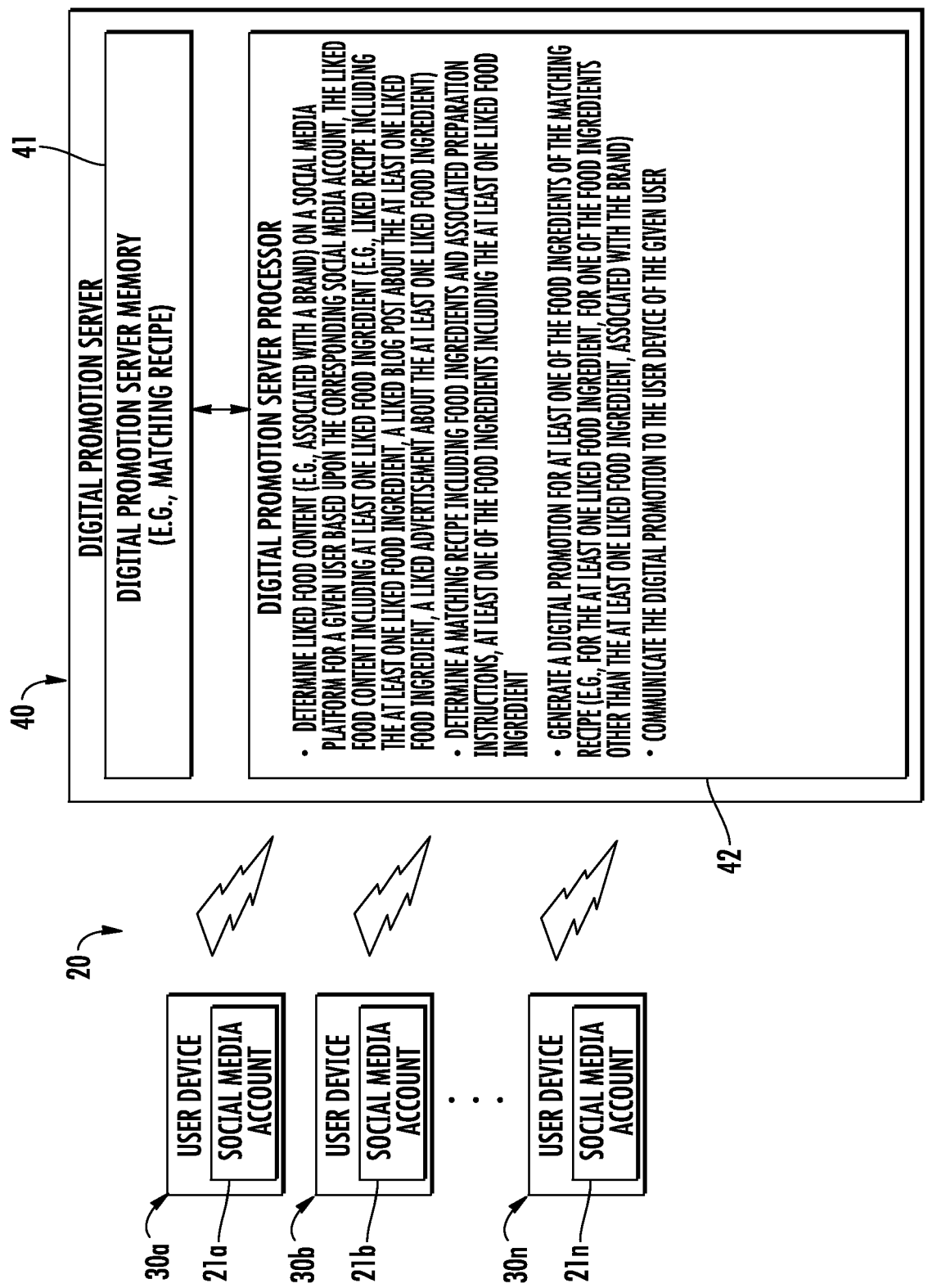
FIG. 2 is a schematic block diagram of a system for processing a digital promotion in accordance with an embodiment.

Referring initially to FIGS. 1-2, a digital promotion processing system 20 includes user devices 30a-30n each associated with a given user. Each user has a social media account 21a-21n associated therewith. Those skilled in the art will appreciate that a social media account 21a-21n may permit the given user to post text, post photos, follow other users, comment on other users' posts, and like content through a "like" indication.

The user devices 30a-30n are each illustratively in the form of a mobile wireless communications device, such as, for example, a mobile or smart phone. Each user device 30a-30n may be another type of device, for example, a personal computer either wired or wireless, a tablet computer, and/or a wearable device. Of course each user device 30a-30n may be another type of device as will be appreciated by those skilled in the art.

The digital promotion processing system 20 also includes a digital promotion server 40. The digital promotion server 40 includes a memory 41 and a processor 42 that cooperates with the memory 41. It should be understood that while operations of the digital promotion server 40 are described herein, those operations are based upon cooperation of the memory 41 and the processor 42. The digital promotions server 40 may communicate with the user device 30a-30n by way of one or more communications networks, for example, the Internet.

Figure 3:
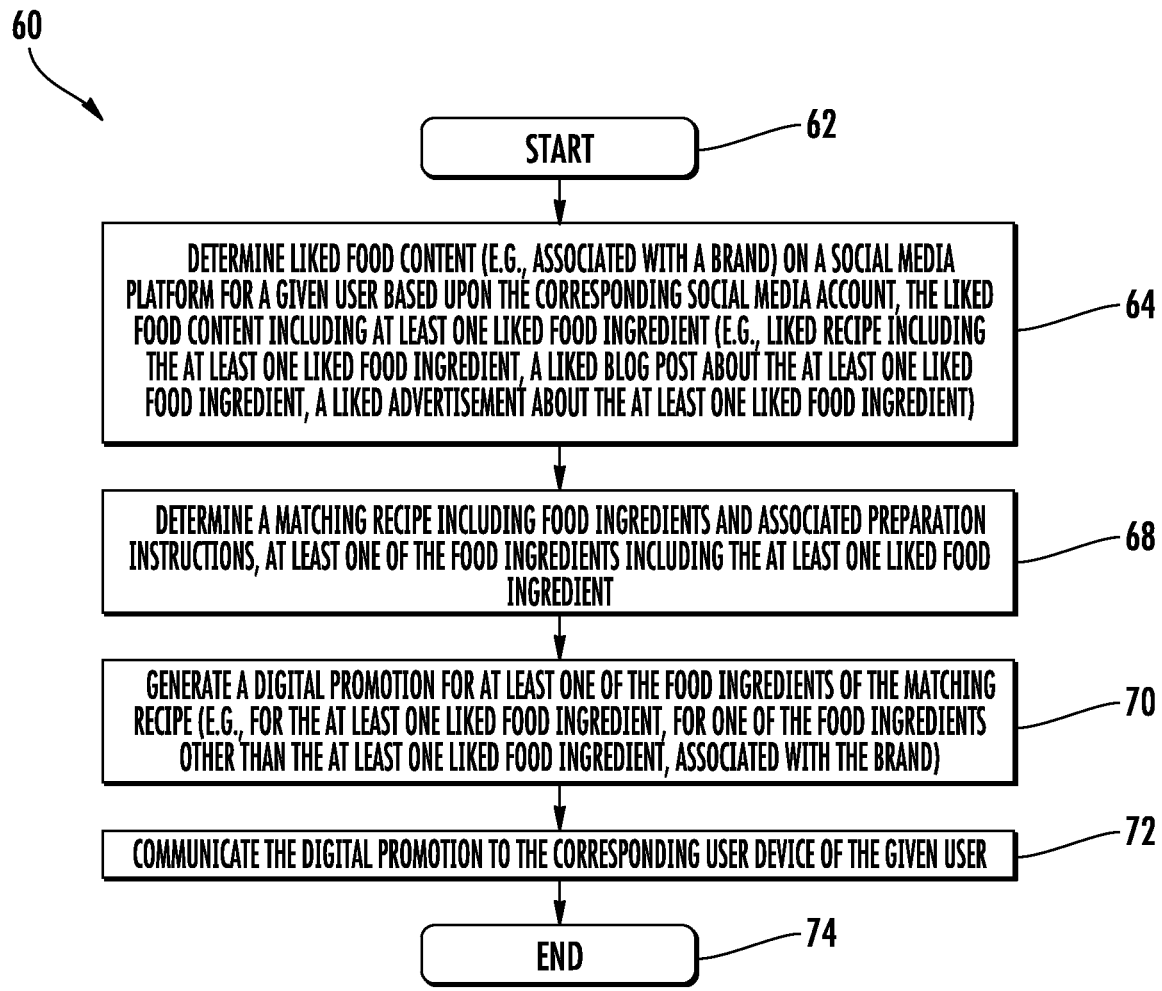
FIG. 3 is a flow chart illustrating operation of a digital promotion server of a system for processing a digital promotion in accordance with an embodiment.

Referring now additionally to the flowchart 60 in FIG. 3, beginning at Block 62 operation of the system 20 with respect to the digital promotion server 40 will be described. At Block 64, the digital promotion server 40 determines liked food content 43 on a social media platform for a given user based upon the corresponding social media account 21a-21n. The liked food content 43 includes one or more liked food ingredients 44. More particularly, the digital promotion server 40 cooperates with the social media platform or tracks the activity of each given user on the social media platform to determine when a given user likes food content. As will be appreciated by those skilled in the art, when a given user likes content, the user generally indicates the liking, which is made publically available. The digital promotion server 40 may determine liked food content 43 on more than one social media platform, for example, based upon corresponding social media accounts 21a-21n.

The liked food content 43 may include any one or more of a liked recipe including the at least one liked food ingredient 44, a liked blog post about the at least one liked food ingredient, and a liked advertisement about the at least one liked food ingredient. For example, an advertisement for Brand-B Bacon may appear in a social media feed or a recipe for Brand-B Bacon Wrapped Steaks may appear in the social media feed (FIG. 1). The given user may like in the social media platform either of the advertisement or recipe based upon a liking of Brand-B Bacon. The liked food content 43 may be associated with a brand and/or class or type of product, for example, as part of an advertising campaign for the brand.

At Block 68, the digital promotion server 40 determines a matching recipe 45 that includes food ingredients 46a-46n and associated preparation instructions 47. At least one of the food ingredients 46a-46n of the matching recipe 45 includes the liked food ingredient 44 (e.g., Brand-B Bacon). In other words, the digital promotion server 40 determines the matching recipe 45 based upon a match between one of the food ingredients 46a-46n of the recipe and the liked food ingredient 44. The matching recipe 45 may be stored in the memory 41 of the digital promotion server 40, obtained via the Internet (e.g., retrieved from a blog, website, etc.), or obtained from a social media feed on the social media platform. With respect to the Brand-B Bacon example above, the matching recipe 45 may be for a Brand-B Bacon, egg, and cheese sandwich.

The digital promotion server 40, at Block 70, generates a digital promotion 21 for one or more of the food ingredients 46a-46n of the matching recipe 45. The digital promotion 21 may be for the liked food ingredient 44. Alternatively, the digital promotion 21 may be for another food ingredient 46a-46n of the matching recipe 45. With respect to the Brand-B Bacon example, above, the digital promotion 21 may be for a discount (e.g., $1.00 off) on Brand-B Bacon or on a dozen eggs. In some embodiments, more than one digital promotion 21 may be generated, for example, for the liked food ingredient 44 and another food ingredient 46a-46n. The digital promotion 21 may be in the form of a digital coupon or digital rebate, as will be appreciated by those skilled in the art. Where the liked food content 43 is associated with a brand, the digital promotion server 40 may generate the digital promotion 21 for at least one of the food ingredients 46a-46n of the matching recipe 45 that is associated with the brand.

The digital promotion server 40 communicates, for example, wirelessly, the matching recipe 45 and the digital promotion 21 to the corresponding user device 30a-30n of the given user (Block 72). The corresponding user device 30a-30n may display the matching recipe 45 and the digital promotion 21 on a display 35a thereof. In some embodiments, the digital promotion 21 may be stored in a digital wallet, either in a memory of the user device 30a-30n and/or the memory 41 of the digital promotion server 40. The digital promotion 21 may be redeemable at any number of redemption locations, for example, during a checkout process at a point-of-sale (POS) terminal. In some embodiments, the digital promotion 21 may be redeemed, for example, at selected redemption locations. The operations end at Block 74.

In another implementation example based upon the embodiments described above, a given user may "like" Brand-C Cola on a social media platform. Based upon the liking, the digital promotion server 40 may determine a matching recipe 45 for "Rum And Cola" using both Brand-C Cola and Brand-R Rum and generate a digital promotion 21 for either or both of the Brand-R Rum and Brand-C Cola.

Figure 4:
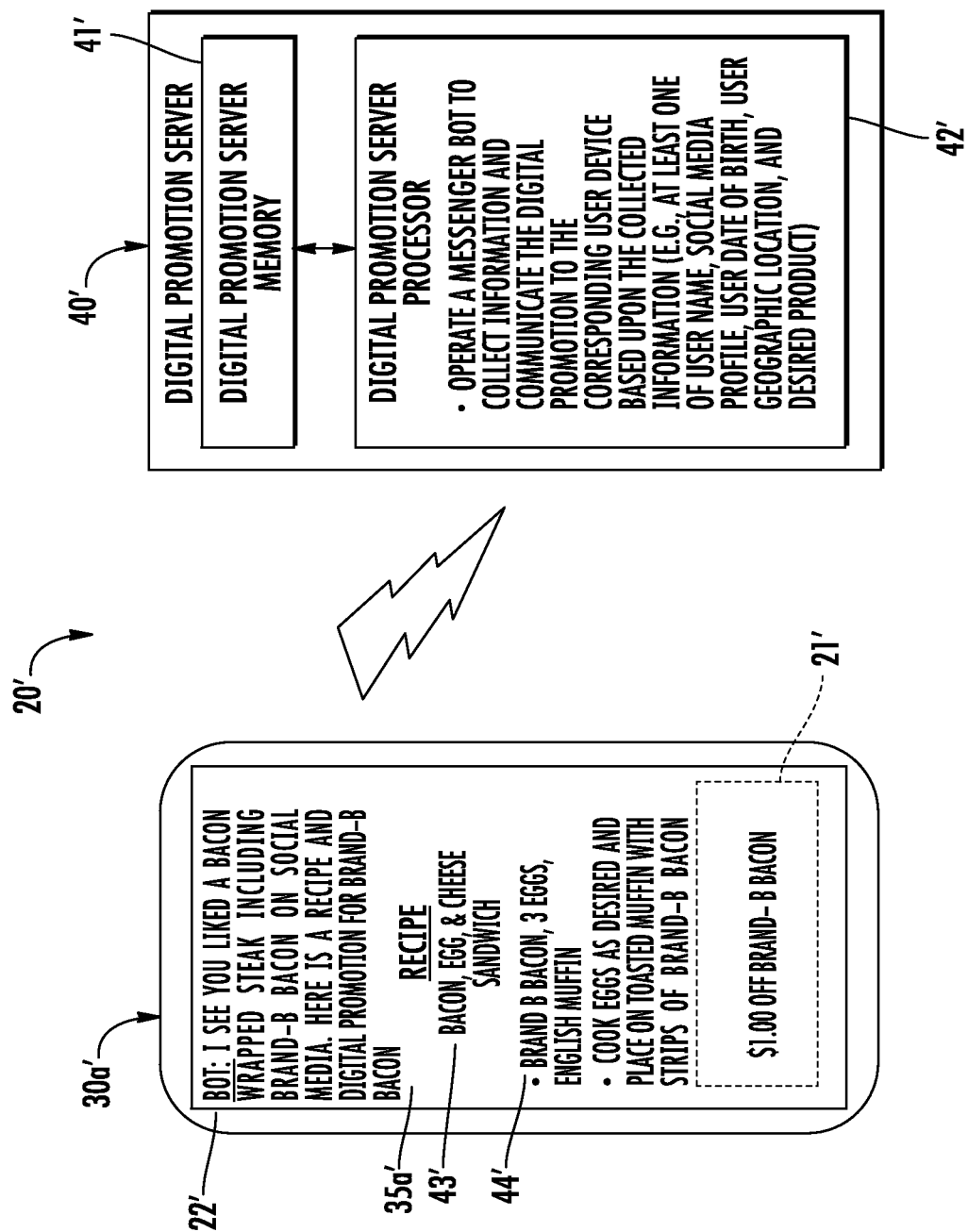
FIG. 4 is a schematic diagram of a system for processing a digital promotion in accordance with another embodiment.

Referring now to FIG. 4, in another embodiment, the digital promotion server 40', and more particularly, the digital promotion server processor 42' may additionally operate a messenger bot 22' that may be associated with the digital promotion 21' on the user devices 30a'. The liked food content 43' or ingredient 44' may be associated with a brand and/or class or type of product, for example, and thus the messenger bot 22' may be associated with the given brand. Through the use of the messenger bot 22' the digital promotion 21' along with the matching recipe 45' may be displayed on the display 35a' of a user device 30a', for example, inline in a social media feed.

Those skilled in the art will appreciate that the messenger bot 22' may be implemented in the form of a two-way dialog box that permits the given user to communicate by way of typing (i.e., written communication). In some embodiments, the messenger bot 22' may operate through voice commands or spoken words. The underlying program behind the messenger bot 22' may be a different program, application, and/or website than that serving the digital promotion 21'. For example, the digital promotion 21' may be inline in a news feed on Facebook while the messenger bot 22' may be executed through the Facebook Messenger program or application. The application or program associated with the messenger bot 22' may be executed or opened, for example, based upon user selection of the digital promotion 21'.

The digital promotion server 40', through the messenger bot 22' collects information. For example, through the messenger bot 22', the digital promotion server 40' may obtain the given user's name, social media username, email address, social media profile, date of birth, geographic location, and/or desired product from the brand. Of course, the digital promotion server 40' may collect other and/or additional types of information. The digital promotion server 40' communicates the digital promotion 21' through the messenger bot 22' to the given user device 30a', for example, based upon the collected information.

As will be appreciated by those skilled in the art, through the use of specific and improved technologies, for example, with respect to correlation of liked food content on social media and a matched recipe and digital promotion, and the messenger bot, the digital promotion system 20 may advantageously provide increased sales of the liked food ingredient 44. This may be particularly advantageous for a marketing campaign, for example, associated with a brand, by taking advantage of the popularity of social media.

A method aspect is directed to a method of processing a digital promotion 21. The method includes using a digital promotion server 40 that includes a processor 42 and an associated memory 41 to determine liked food content 43 on a social media platform for a given user based upon a social media account 21a-21n associated with a respective user. The respective user is associated with a user device 30a-30n from among a plurality thereof. The liked food content 43 includes at least one liked food ingredient 44. The method includes using the digital promotion server 40 to determine a matching recipe 45 that includes a plurality of food ingredients 46a-46n and associated preparation instructions 47. At least one of the plurality of food ingredients 46a-46n includes the at least one liked food ingredient 44. The method also includes using the digital promotion server 40 to generate a digital promotion 21 for at least one of the food ingredients 46a-46n of the matching recipe 45 and communicate the matching recipe and the digital promotion to the corresponding user device 30a-30n of the given user.

A computer readable medium aspect is directed to a non-transitory computer readable medium for processing a digital promotion 21. The non-transitory computer readable medium includes computer executable instructions that when executed by a processor 42 cause the processor to perform operations. The operations include determining liked food content 43 on a social media platform for a given user based upon a social media account 21a-21n associated with a respective user. The respective user is associated with a user device 30a-30n from among a plurality thereof. The liked food content 43 includes at least one liked food ingredient 44. The operations also include determining a matching recipe 45 that includes a plurality of food ingredients 46a-46n and associated preparation instructions 47. At least one of the plurality of food ingredients 46a-46n include the at least one liked food ingredient 44. The operations also include generating a digital promotion 21 for at least one of the food ingredients 46a-46n of the matching recipe 45 and communicating the matching recipe and the digital promotion to the corresponding user device 30a-30n of the given user.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
a plurality of user devices each associated with a respective user, each respective user having a social media account associated therewith; and
a digital promotion server configured to
track activity of each respective user to determine a liked social media post on a social media platform for a given user based upon the associated social media account, the liked social media post having food content comprising at least one liked food ingredient associated with a given brand,
determine a matching recipe from the social media platform, the matching recipe comprising a plurality of food ingredients and associated preparation instructions, wherein at least one of the plurality of food ingredients comprises the at least one liked food ingredient,
in response to determining the liked social media post, operate a messenger bot implemented in a form of a two-way dialog between the messenger bot and the given user to collect information and display on a corresponding one of the user devices the matching recipe in the two-way dialog, the collected information comprising a user name, social media profile, user geographic location, and desired product from the given brand,
generate a digital coupon redeemable toward a purchase of at least one of the food ingredients of the matching recipe of the given brand and display the digital coupon in the two-way dialog based upon the collected information,
operate the messenger bot to inject the matching recipe and the digital coupon inline in a social media feed associated with the given user based upon the collected information, and
cooperate with the corresponding user device to store the digital coupon in a digital wallet associated with the given user.

2. The system of claim 1 wherein the digital coupon is for the at least one liked food ingredient.

3. The system of claim 1 wherein the digital coupon is for one of the plurality of food ingredients other than the at least one liked food ingredient.

4. The system of claim 1 wherein the food content comprises at least one of a liked recipe including the at least one liked food ingredient, and a liked advertisement about the at least one liked food ingredient.

5. The system of claim 1 wherein the information collected from the messenger bot comprises at least one of a user name, social media profile, user date of birth, user geographic location, and desired product from the given brand.

6. A digital promotion server for processing a digital coupon, the digital promotion server comprising:
   a memory; and
   a processor coupled to the memory and configured to
      track activity of respective users each having a social media account associated therewith to determine a liked social media post on a social media platform for a given user based upon the associated social media account, each respective user associated with a user device from among a plurality thereof, and the liked social media post having food content comprising at least one liked food ingredient associated with a given brand,
      determine a matching recipe from the social media platform, the matching recipe comprising a plurality of food ingredients and associated preparation instructions, wherein at least one of the plurality of food ingredients comprises the at least one liked food ingredient,
      in response to determining the liked social media post,
         operate a messenger bot implemented in a form of a two-way dialog between the messenger bot and the given user to collect information and display on a corresponding one of the user devices the matching recipe in the two-way dialog, the collected information comprising a user name, social media profile, user geographic location, and desired product from the given brand,
         generate a digital coupon redeemable toward a purchase of at least one of the food ingredients of the matching recipe of the given brand and display the digital coupon in the two-way dialog based upon the collected information,
         operate the messenger bot to inject the matching recipe and the digital coupon inline in a social media feed associated with the given user based upon the collected information, and
         cooperate with the corresponding user device to store the digital coupon in a digital wallet associated with the given user.

7. The digital promotion server of claim 6 wherein the digital coupon is for the at least one liked food ingredient.

8. The digital promotion server of claim 6 wherein the digital coupon is for one of the plurality of food ingredients other than the at least one liked food ingredient.

9. The digital promotion server of claim 6 wherein the liked food content comprises at least one of a liked recipe including the at least one liked food ingredient, and a liked advertisement about the at least one liked food ingredient.

10. A method of processing a digital coupon comprising:
    using a digital promotion server comprising a processor and an associated memory to
       track activity of respective users each having a social media account associated therewith to determine a liked social media post having liked food content on a social media platform for a given user based upon the associated social media account, the respective user associated with a user device from among a plurality thereof, and the liked social media post having food content comprising at least one liked food ingredient associated with a given brand,
       determine a matching recipe from the social media platform, the matching recipe comprising a plurality of food ingredients and associated preparation instructions, wherein at least one of the plurality of food ingredients comprises the at least one liked food ingredient,
       in response to determining the liked social media post,
          operate a messenger bot implemented in a form of a two-way dialog between the messenger bot and the given user to collect information and display on a corresponding one of the user devices the matching recipe in the two-way dialog, the collected information comprising a user name, social media profile, user geographic location, and desired product from the given brand,
          generate a digital coupon redeemable toward a purchase of at least one of the food ingredients of the matching recipe of the given brand and display the digital coupon in the two-way dialog based upon the collected information,
          operate the messenger bot to inject the matching recipe and the digital coupon inline in a social media feed associated with the given user based upon the collected information, and
          cooperate with the corresponding user device to store the digital coupon in a digital wallet associated with the given user.

11. The method of claim 10 wherein the digital coupon is for the at least one liked food ingredient.

12. The method of claim 10 wherein the digital coupon is for one of the plurality of food ingredients other than the at least one liked food ingredient.

13. The method of claim 10 wherein the liked food content comprises at least one of a liked recipe including the at least one liked food ingredient, and a liked advertisement about the at least one liked food ingredient.

14. A non-transitory computer readable medium for processing a digital coupon, the non-transitory computer readable medium comprising computer executable instructions that when executed by a processor cause the processor to perform operations comprising:
    tracking activity of respective users each having a social media account associated therewith to determine a liked social media post on a social media platform for a given user based upon the associated social media account, the respective user associated with a user device from among a plurality thereof, and the liked social media post having food content comprising at least one liked food ingredient associated with a given brand;
    determining a matching recipe from the social media platform, the matching recipe comprising a plurality of food ingredients and associated preparation instructions, wherein at least one of the plurality of food ingredients comprises the at least one liked food ingredient; and
    in response to determining the liked social media post,
       operating a messenger bot implemented in a form of a two-way dialog between the messenger bot and the given user to collect information and display on a corresponding one of the user devices the matching recipe in the two-way dialog, the collected information comprising a user name, social media profile, user geographic location, and desired product from the given brand, generating a digital coupon redeemable toward a purchase of at least one of the food ingredients of the matching recipe of the given brand and display the digital coupon in the two-way dialog based upon the collected information, operating the messenger bot to inject the matching recipe and the digital coupon inline in a social media feed associated with the given user based upon the collected information, and cooperating with the corresponding user device to store the digital coupon in a digital wallet associated with the given user.

15. The non-transitory computer readable medium of claim 14 wherein the digital coupon is for the at least one liked food ingredient.

16. The non-transitory computer readable medium of claim 14 wherein the digital coupon is for one of the plurality of food ingredients other than the at least one liked food ingredient.

17. The non-transitory computer readable medium of claim 14 wherein the liked food content comprises at least one of a liked recipe including the at least one liked food ingredient, and a liked advertisement about the at least one liked food ingredient.

* * * * *